(12) United States Patent
Meng et al.

(10) Patent No.: US 11,969,762 B1
(45) Date of Patent: Apr. 30, 2024

(54) DEVICE AND METHOD FOR AUTOMATICALLY CATEGORIZING SCREWDRIVER BITS

(71) Applicants: Ji-Fen Meng, Taichung (TW); Kyle Liu, Taichung (TW)

(72) Inventors: Ji-Fen Meng, Taichung (TW); Kyle Liu, Taichung (TW)

(73) Assignee: JEOUTAY LIU INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 18/205,560

(22) Filed: Jun. 4, 2023

(51) Int. Cl.
| | | |
|---|---|---|
| *B07C 5/34* | (2006.01) | |
| *B07C 5/08* | (2006.01) | |
| *B07C 5/12* | (2006.01) | |
| *B65G 47/14* | (2006.01) | |
| *B65G 47/24* | (2006.01) | |
| *B65G 47/50* | (2006.01) | |

(52) U.S. Cl.
CPC .................. *B07C 5/34* (2013.01); *B07C 5/08* (2013.01); *B07C 5/12* (2013.01); *B65G 47/1421* (2013.01); *B65G 47/24* (2013.01); *B65G 47/50* (2013.01); *B65G 2203/0225* (2013.01); *B65G 2812/03* (2013.01)

(58) Field of Classification Search
CPC ........ B65G 2203/0225; B65G 2812/03; B65G 47/1421; B65G 47/24; B07C 5/34; B07C 5/08; B07C 5/12
See application file for complete search history.

(56) References Cited

U.S. PATENT DOCUMENTS

2005/0257599 A1* 11/2005 Kuo .......................... B07C 5/08
                                                                73/570

FOREIGN PATENT DOCUMENTS

CN             107824479 A    *  3/2018      ............... B07C 5/02

* cited by examiner

*Primary Examiner* — Jacob S. Scott
*Assistant Examiner* — Miraj T. Patel

(57) ABSTRACT

A device and a method for automatically categorizing screwdriver bits are provided. The method includes three main steps: accommodating and mixing, vibration feeding, and type categorizing. The device includes a device body and a vibrating feeding cylinder disposed on the device body. The vibrating feeding cylinder includes a rotating holder for vibrating and moving the screwdriver bits and a directional mechanism for arranging the driving tips of the screwdriver bits facing the same direction. A CCD mechanism is disposed on the device body and is used to detect the shape of the driving tips of the screwdriver bits.

8 Claims, 8 Drawing Sheets

DEVICE AND METHOD FOR AUTOMATICALLY CATEGORIZING SCREWDRIVER BITS

FIELD OF THE DISCLOSURE

The present disclosure relates to a device and a method for automatically categorizing screwdriver bits, and more particularly, to the technology applied in technology tools manufacturing. The device and method of the present disclosure provide the advantage of quickly categorizing various types of screwdriver bits.

BACKGROUND OF THE DISCLOSURE

The tool is one of the most commonly used items in any field, whether it is a screwdriver bit, a wrench, a hammer, a tool socket, etc., among which the screwdriver bit has the most diverse types. For example, the driving tip of the screwdriver bit is shaped to fit a driving surface (such as a slot, a cross-recess, or a hexagonal recess, etc.) on a corresponding screw head or fastener. Screwdriver driving tips are available in various types and sizes, which often causes difficulties in categorization.

It is unavoidable to mix screwdriver bits with different driving tips together during processing, e.g., for electroplating processing procedures. Due to the cost and waste in the electroplating process being the same during the one-time electroplating process, it is common to mix all screwdriver bits with different driving tips to reach a certain weight for the electroplating process to save the cost and waste. However, after the electroplating process, sorting the mixed screwdriver bits with different driving tips becomes a problem to be solved.

Some screwdriver bits are less than 1 cm in length, and the diameter of the driving tips is even smaller than 0.3 cm. Therefore, it is not only a test for eyes, but also time-consuming when categorizing screwdriver bits with different driving tips. Moreover, the similarity between the cross-recess drive tip and the hexagonal-recess driving tip is extremely high. Regarding manual categorizing, it takes at least one morning to categorize 500 kilograms of mixed screwdriver bits with different driving tips. It is difficult to efficiently and accurately categorize the screwdriver bits with different driving tips completely and clearly, which often results in many problems that the screwdriver bits manufacturers receive customer complaints about poor quality control after sales.

Therefore, it is a need for the screwdriver bits manufacturers to improve the categorizing method, and more importantly, to solve the problem of time-consuming and inaccurate categorization. The present disclosure provides a device and a method for automatically categorizing screwdriver bits with high efficiency and accurate categorization to benefit the related industry.

SUMMARY OF THE DISCLOSURE

The main purpose of the present disclosure is to improve the device and method in the field of tool manufacturing. Accordingly, the deficiencies mentioned above and problems can be improved, and huge costs can be saved to achieve the best industrial benefit and practicability.

The present disclosure provides a method for automatically categorizing screwdriver bits, including accommodating and mixing, vibration feeding, and type categorizing.

Accommodating and mixing: providing various types of screwdriver bits in a vibrating feeding cylinder.

Vibration feeding: vibrating and moving the screwdriver bits in the vibration feeding cylinder to a directional mechanism of the vibration feeding cylinder, so that all driving tips of the screwdriver bits can be arranged to face the same direction, and the screwdriver bits gradually and sequentially move into a conveyor.

Type categorizing: detecting and categorizing the type of screwdriver bits by a CCD mechanism with a selected type of driving tip of the screwdriver bit, and culling or collecting an unselected type of the screwdriver bits into a first collecting box.

The device for automatically categorizing screwdriver bits, including a device body; a vibrating feeding cylinder, disposed on the device body. The vibrating feeding cylinder has a rotating holder for accommodating a plurality of screwdriver bits, a conveyor connected with an upper side of the rotating holder, and a directional mechanism; wherein the vibrating feeding cylinder generates vibration to move the screwdriver bits towards the conveyor, and the screwdriver bits can be arranged to enter the conveyor with tip end at the front, and the screwdriver bits with tip end at the back can be culled and moved back to the rotating holder; a CCD mechanism, disposed on the device body and near the conveyor; wherein the CCD mechanism detects and categorizes the type of the screwdriver bits, and collects the selected type of the screwdriver bits in one part of a first collecting box, and collects the unselected type of the screwdriver bits in the other part of the first collecting box.

In summary, the advantage of the present disclosure is that the screwdriver bits with different driving tips can be categorized through the method and device of the present disclosure. By the CCD mechanism, the screwdriver bits with the same driving tips can be collected in one group, and the screwdriver bits with different driving tips can be collected in another group. The categorization and sorting are repeated until the screwdriver bits are all categorized into individual groups with a single size or a single driving tip shape.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

Figure 1:
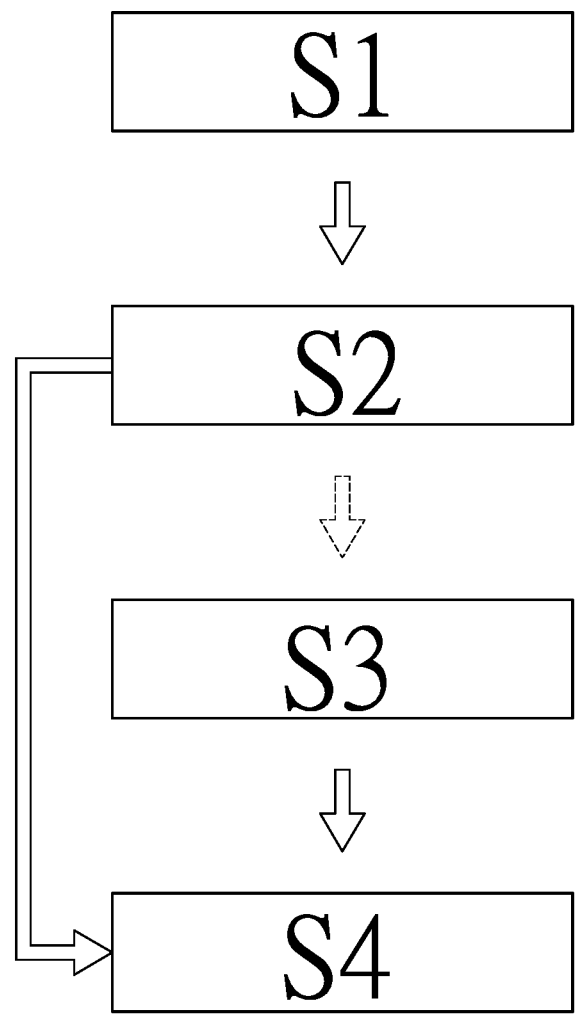
FIG. 1 is a flowchart schematic view of the steps of the present disclosure.
Figure 2:
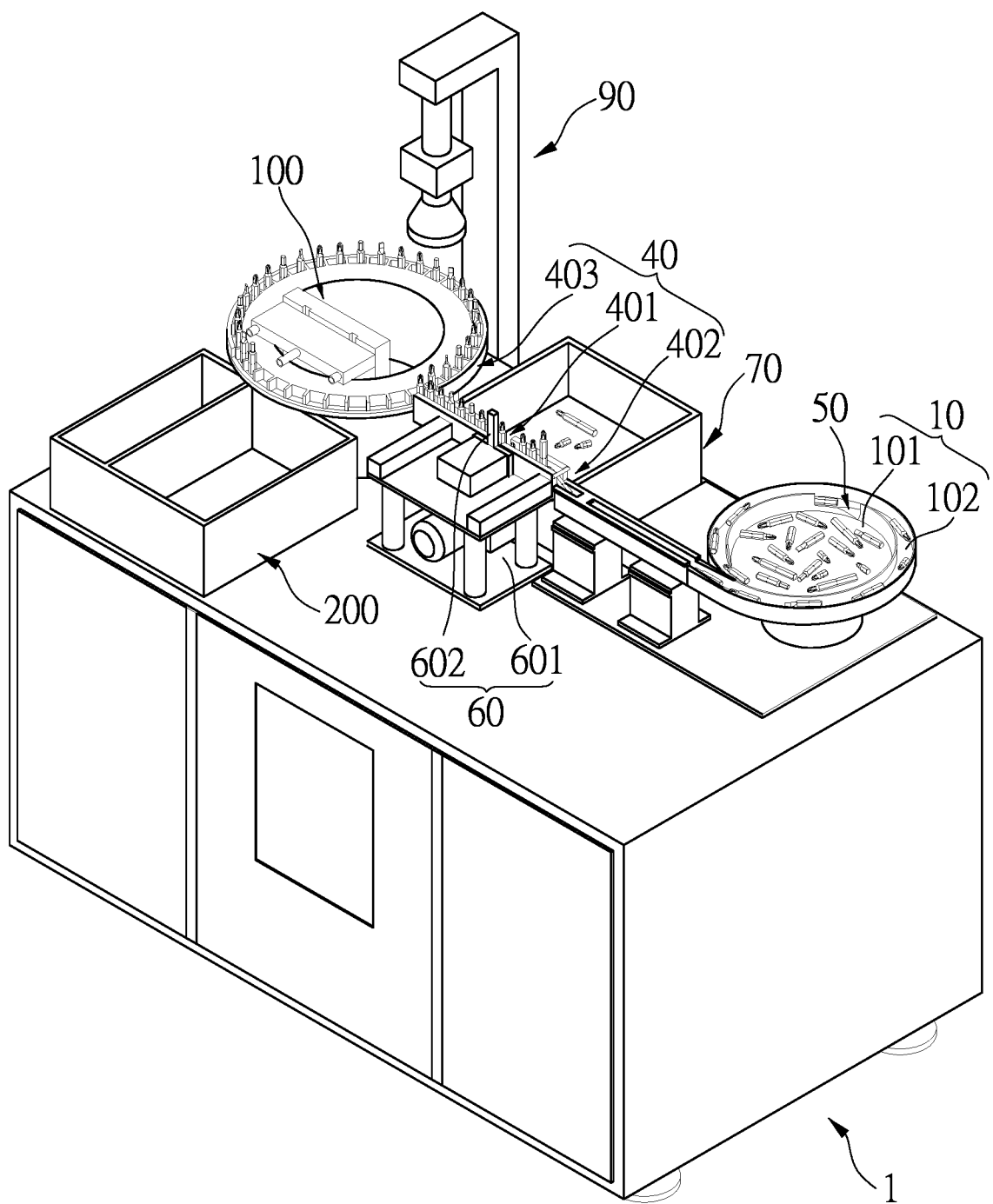
FIG. 2 is a perspective schematic view of a device body of the present disclosure.

Referring to FIGS. 1-8, the present disclosure provides a method for automatically categorizing screwdriver bits, the method comprising:

Accommodating and mixing (S1): providing screwdriver bits (20, 30, 80) with various types of driving tips (21, 31, 81) on a rotating holder (101) of a vibrating feeding cylinder (10). In this embodiment, the screwdriver bits (20, 30, 80) have different shapes of driving tips (21, 31, 81). The most serious difficulty in practice is the most detailed categorization of the cross-shaped and hexagonal driving tips. The vibrating feeding cylinder (10) is disposed on a device body (1).

Vibration feeding (S2): vibrating and moving the screwdriver bits (20, 30, 80) on a rotating holder (101) of the vibration feeding cylinder (10). A conveyor (40) is connected to an upper side of the rotating holder (101). The screwdriver bits (20, 30, 80) with different shapes of driving tips (21, 31, 81) are moved along a channel (102) in the rotating holder (101) by rotating and vibrating of the vibration feeding cylinder (10). Further, a directional mechanism (50) is used to arrange all the driving tips (21, 31, 81) of the screwdriver bits (20, 30, 80) to be faced in the same direction, and the screwdriver bits (20, 30, 80) gradually and sequentially move from the channel (102) of the vibrating feeding cylinder (10) to the conveyor (40).

Figure 3:
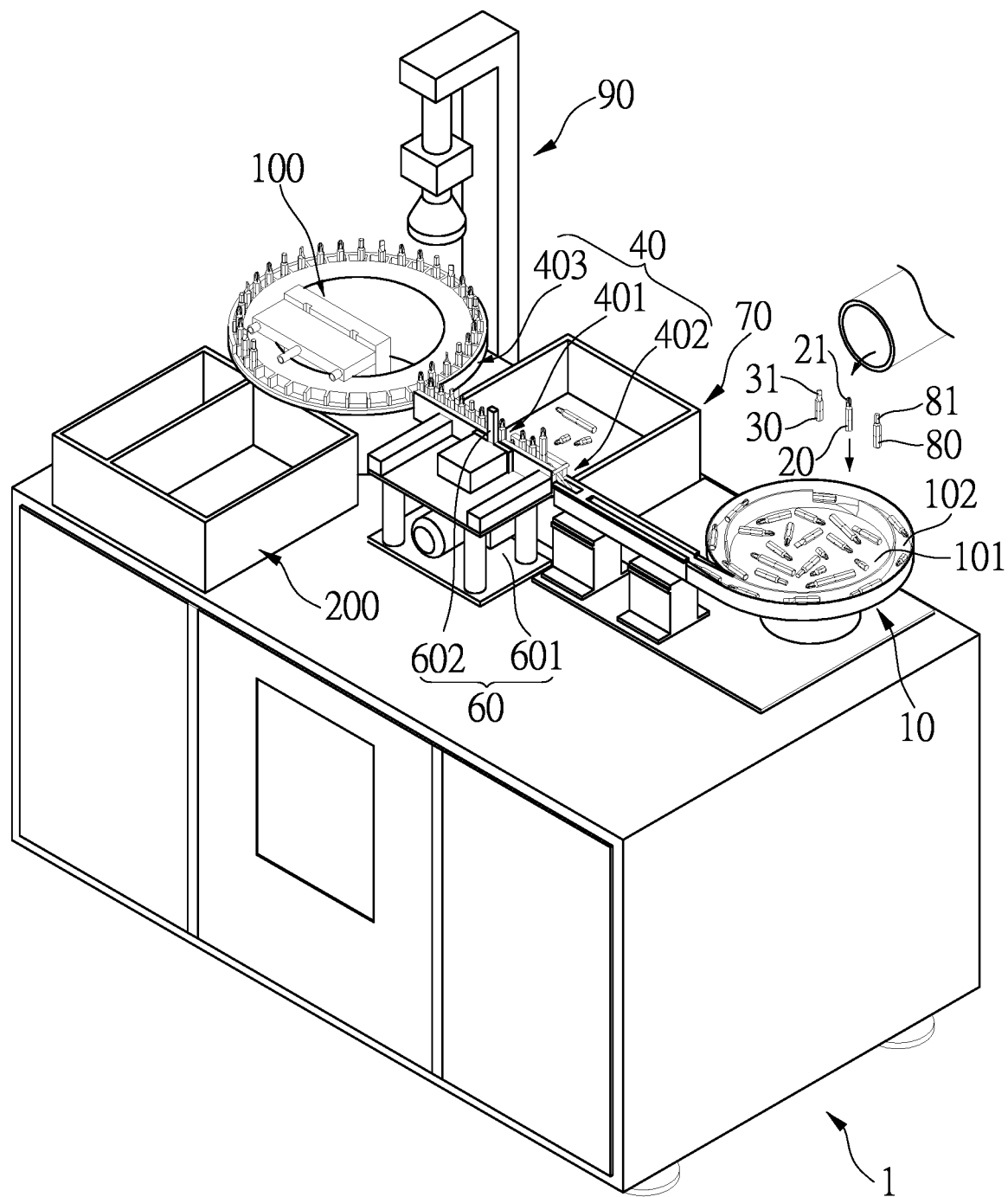
FIG. 3 is a schematic view of the step accommodating and mixing of the present disclosure in practice.
Figure 4:
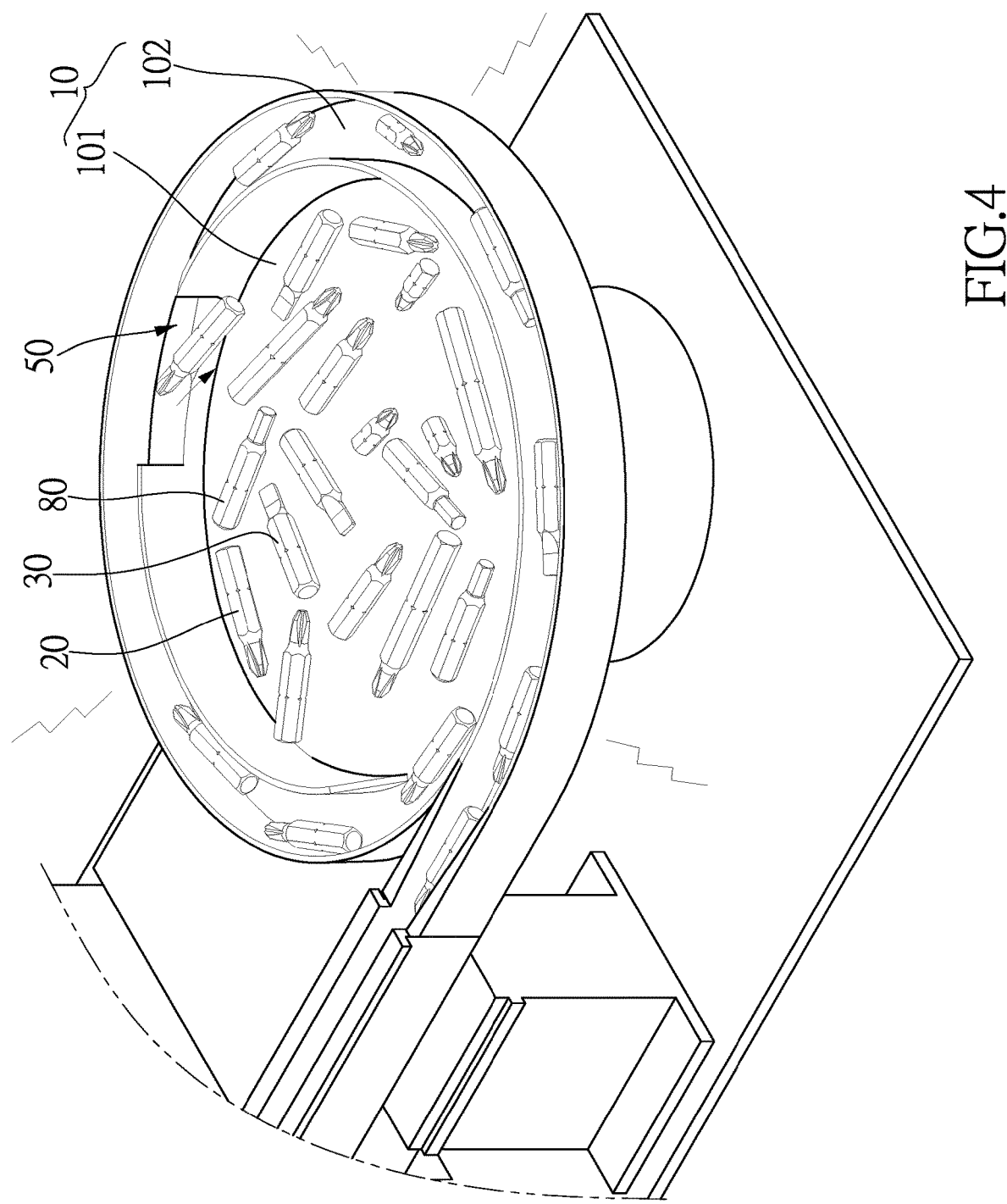
FIG. 4 is a schematic view of the step vibration feeding of the present disclosure in practice.
Figure 5:
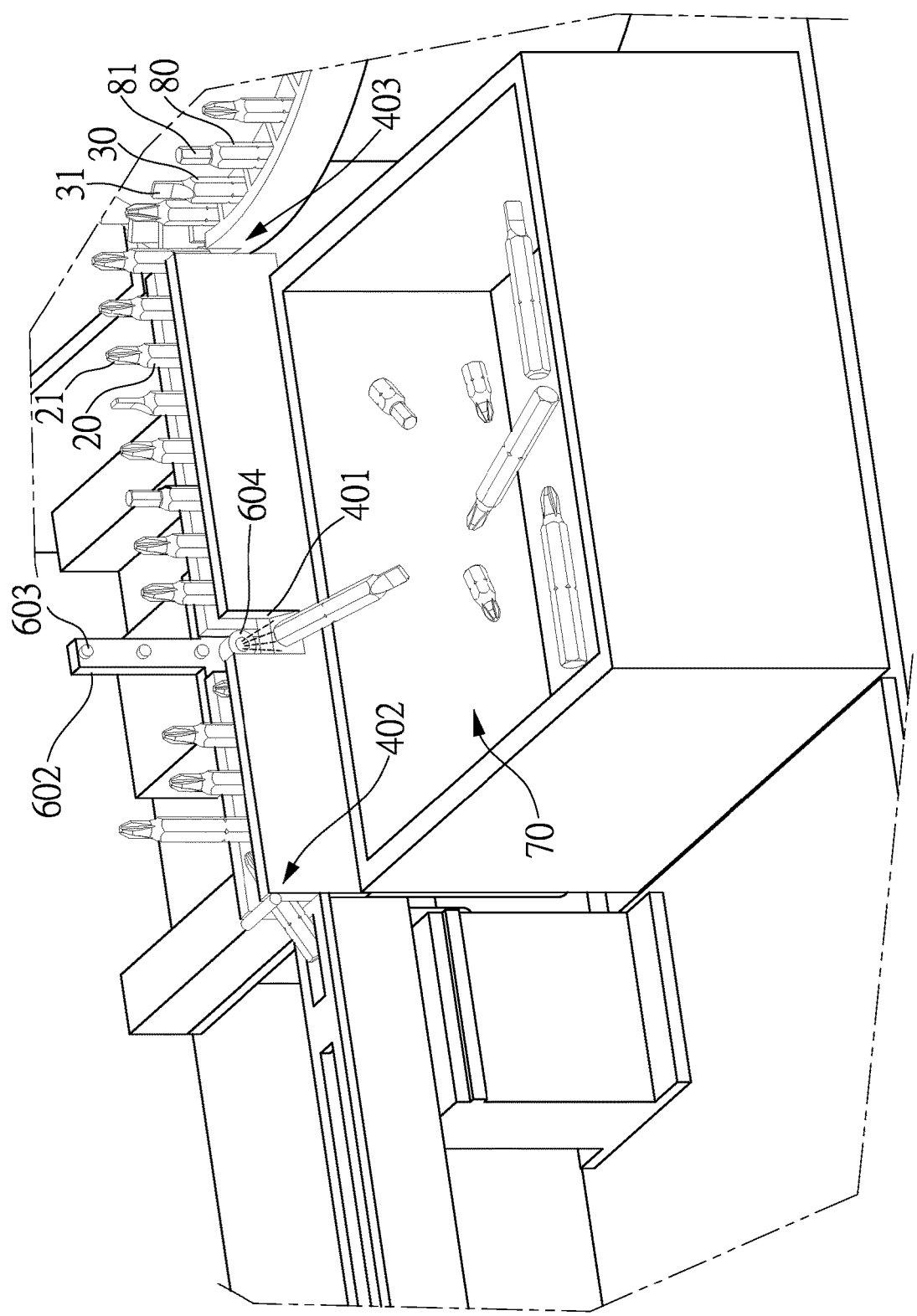
FIG. 5 is a schematic view of the step size categorization of the present disclosure in practice.

In detail, the directional mechanism (50) is used to limit the driving tips (21, 31, 81) of the screwdriver bits (20, 30, 80). As shown in FIG. 3, the screwdriver bits (20, 30, 80) can be arranged to enter the conveyor (40) with the driving tip side, and the screwdriver bits (20, 30, 80) with the other side can be culled by the directional mechanism (50) and moved back to the rotating holder (101). The rotary vibration propulsion of the vibrating feeding cylinder (10) and the directional mechanism (50) has been used for many years in the industry, and there are many types of mechanisms, as disclosed in https://kknews.cc/news/bzannmj.html. The rotary vibration propulsion is well known and used in the general industry, so it will not be described in detail here.

Size categorization (S3): The screwdriver bits (20, 30, 80) with the different driving tips (21, 31, 81) are regularly arranged in the same direction, and moved from the vibrating feeding cylinder (10) through the channel (102) to the conveyor (40). In order to be able to categorize the screwdriver bits (20, 30, 80) with different sizes, the present disclosure further provides two solutions. Firstly, a size-detecting mechanism (60) is disposed on the device body (1) and near the conveyor (40) for detecting the size of the screwdriver bits (20, 30, 80), and culling or collecting unselected or selected size of the screwdriver bits into a second collecting box (70). The size-detecting mechanism (60) detects and categorizes different sizes of the screwdriver bits (20, 30, 80). the size-detecting mechanism (60) includes a size-detecting mechanism body (601), a detecting rod (602), a plurality of sensing members (603), and a pushing portion (604) arranged on one side of the detecting rod; the detecting rod (602) is disposed on the size-detecting mechanism body (601) and faced to the conveyor (40), the second collecting box (70) is disposed on the device body (1) and near the conveyor (40). A pushing port (401) is disposed on the conveyor (40) corresponding to the detecting rod (602), and the pushing portion (604) is disposed on the same side as the detecting rod (602) and the plurality of sensing members (603). The screwdriver bit (20, 30, 80) passes through the detecting rod (602) on the conveyor (40), the sensing member (603) detects the size of the screwdriver bit (20, 30, 80), the pushing portion (604) pushes unselected size screwdriver bits (20, 30, 80) into the second collecting box (70) through the pushing port (401). According to the above description, in the detection of each sensing member (603) of the present disclosure, the first method is that the horizontal screwdriver bits (20, 30, 80) face the same direction and must be arranged into a vertical position sequentially (that is to say, change position from a horizontal state to an upright standing state). The horizontal screwdriver bits (20, 30, 80) can be erected regularly from 30 degrees, 60 degrees, and 90 degrees along the conveyor (40) to achieve a vertical position. The sensing member (603) detects the height of the screwdriver bits (20, 30, 80) in a vertical position. In conjunction with FIG. 5, the conveyor (40) includes an erecting section (402) and a categorizing section (403), the erecting section (402) allows the screwdriver bits (20, 30, 80) to erect from a horizontal position to a vertical position, and the driving tips (21, 31, 81) of the screwdriver bits (20, 30, 80) are upward.

Figure 6:
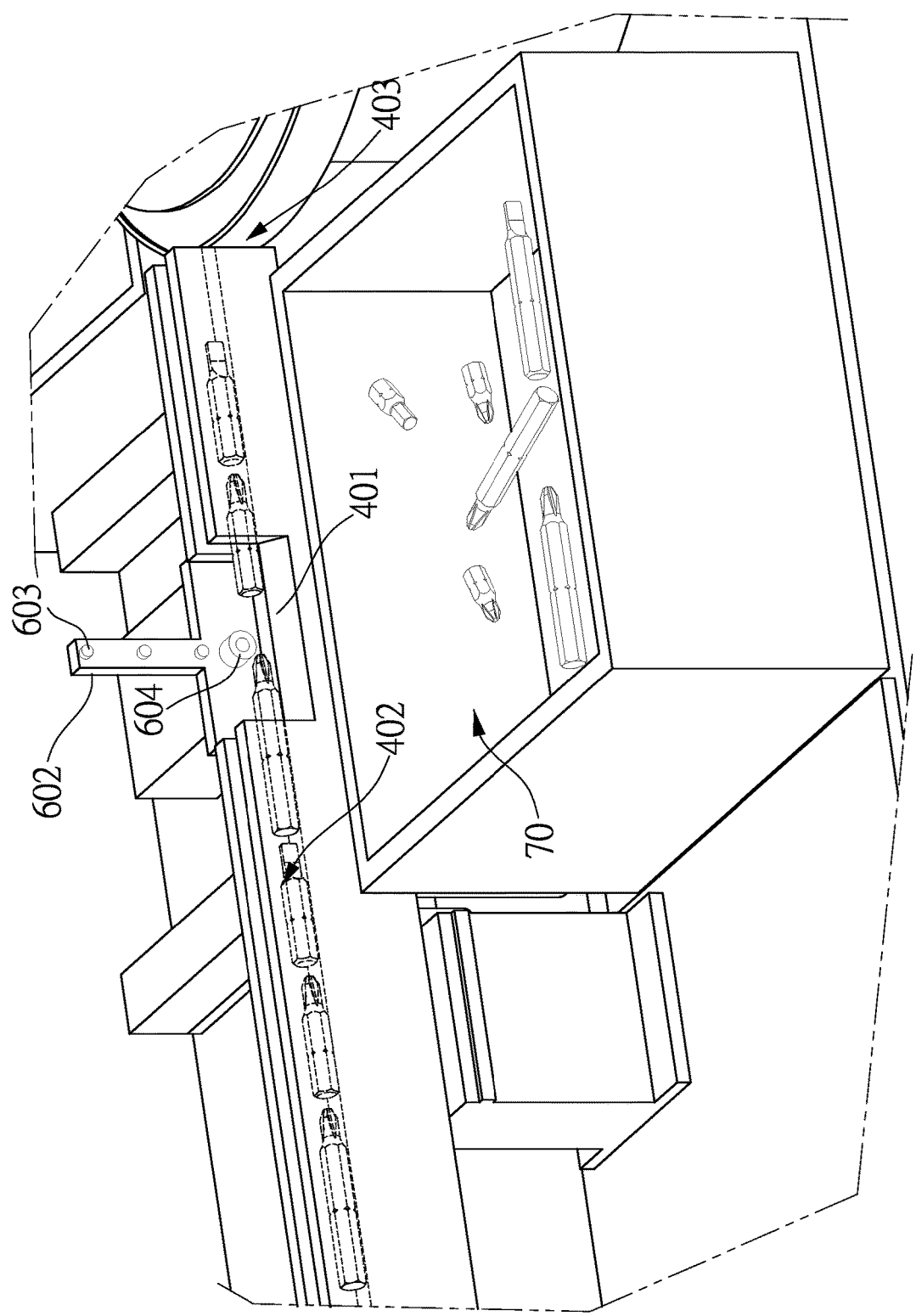
FIG. 6 is another schematic view of the step size categorization of the present disclosure in practice.
Figure 7:
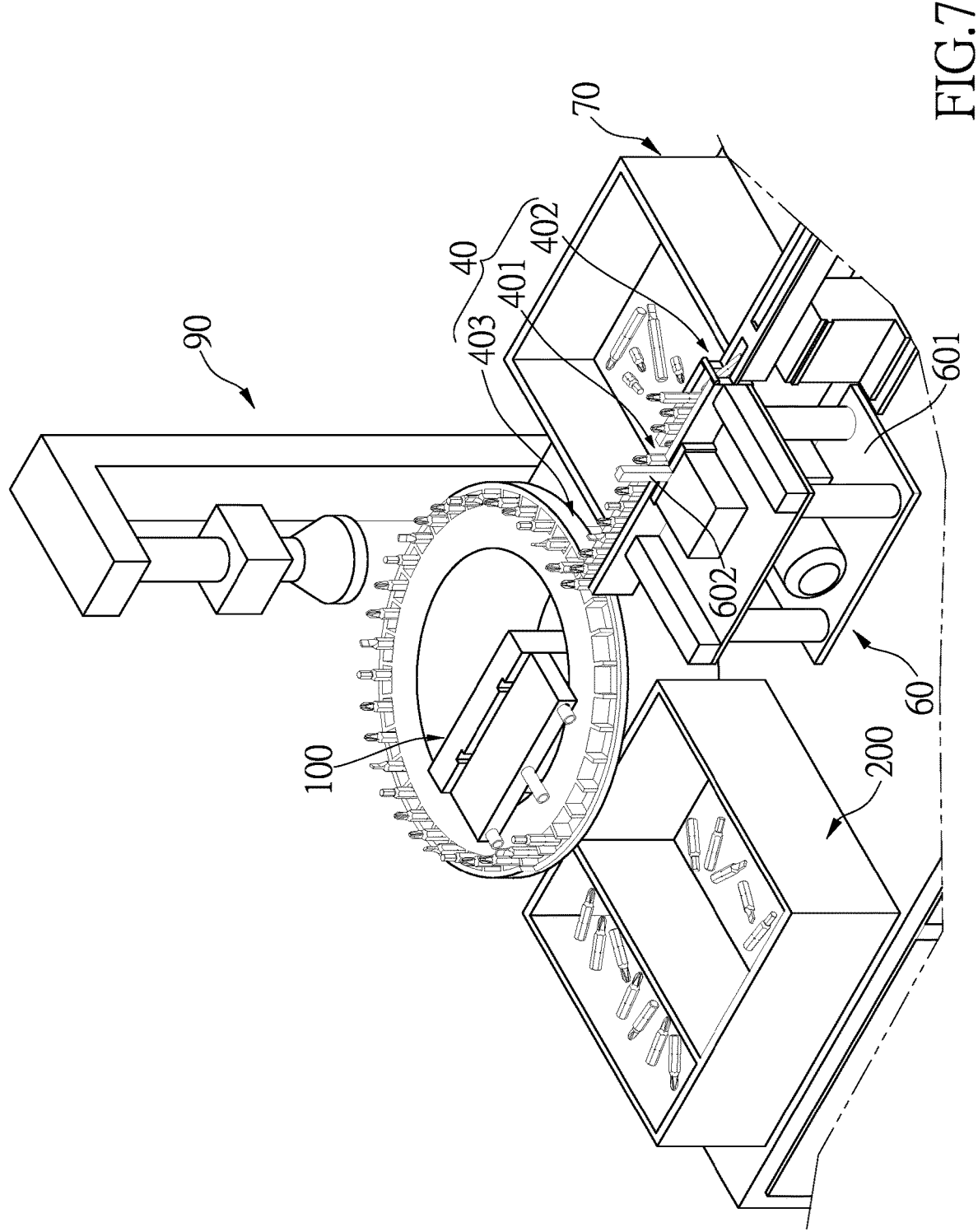
FIG. 7 is a schematic view of the step type categorizing of the present disclosure.
Figure 8:
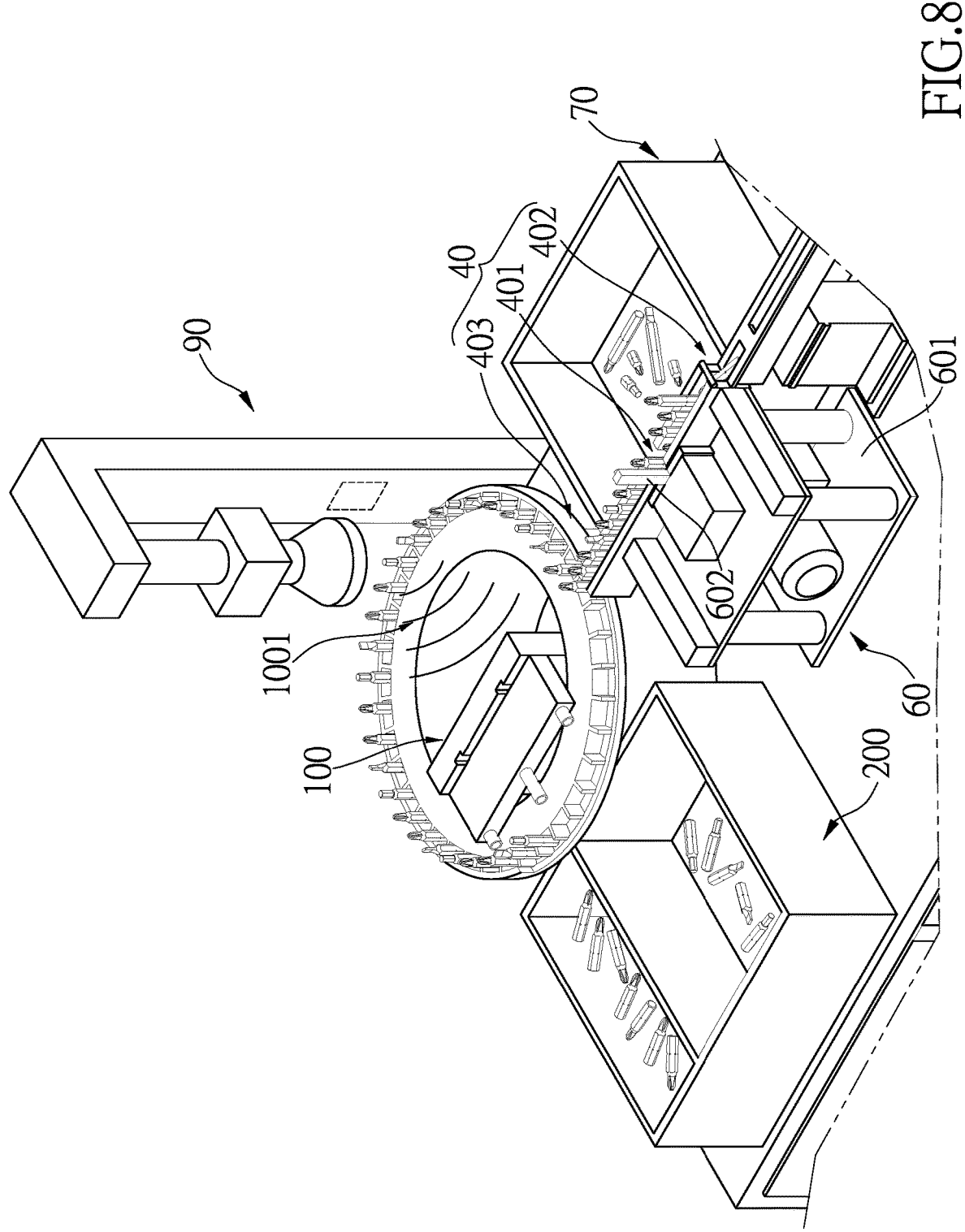
FIG. 8 is a schematic view of CCD mechanism detects and categorizing of the present disclosure.

Secondly, the sensing member (603) detects the size of the screwdriver bits (20, 30, 80) in a horizontal position. The detecting rod (602) is set horizontally, and the pushing port (401) is larger than the pushing port for the vertical position. The screwdriver bits (20, 30, 80) are moved to the conveyor (40) in a horizontal position, and the sensing elements (603) detect the size of the horizontal screwdriver bits (20, 30, 80), as shown in FIG. 6.

Type categorizing (S4): a CCD mechanism (Charged Coupled Device) of a categorizing section (403) of the conveyor (40) and a categorizing mechanism (100) are disposed on the device body (1). The CCD mechanism has the type of selected driving tip inputted in the system (a hexagonal driving tip (81) as an example). The categorizing mechanism (100) is electrically connected with the CCD mechanism (90). the CCD mechanism (90) detects the driving tips (21, 31, 81) of the screwdriver bits (20, 30, 80) and generates category information (1001) to the categorizing mechanism (100). Each screwdriver bit (20, 30, 80) moves to the categorizing mechanism (100) in sequence. The categorizing mechanism (100) collects the screwdriver bits (80) with the selected driving tip (81) (for example, hexagonal shape) into one part of a first collecting box (200), and collects the screwdriver bits without the selected driving tip (81) into the other part of the first collecting box. Therefore, the present disclosure can automatically categorize the screwdriver bits (20, 30, 80) with different driving tips (21, 31, 81).

According to the method steps described above, the step accommodating and mixing (S1) mixes the screwdriver bits (20, 30, 80) with different driving tips (21, 31, 81) in the vibrating feeding cylinder (10), the step vibration feeding (S2) vibrates and moves the screwdriver bits (20, 30, 80) to the directional mechanism (50). In this way, the screwdriver bits (20, 30, 80) with different tips (21, 31, 81) can be arranged and pushed from the channel (102) of the vibrating feeding cylinder (10) along the same direction sequentially.

The size-detecting mechanism (60) categorizes the screwdriver bits (20, 30, 80) of different lengths or sizes, in which the screwdriver bits (20, 30, 80) are arranged to be in a horizontal position or a vertical (upright) position. Finally, step type categorizing (S4): detecting and categorizing the type of screwdriver bits (20, 30, 80) with various types of driving tips (21, 31, 81) by a CCD mechanism (90), culling or collecting the unselected type of the screwdriver bits (20, 30, 80) in a first collecting box (200), and collecting the selected type of the screwdriver bits (20, 30, 80) in another first collecting box (200). Accordingly, the present disclosure provides the advantage of categorizing the mixed screwdriver bits (20, 30, 80) with various types of driving tips (21, 31, 81).

A step size categorization (S3) can be provided before the step type categorizing (S4). In detail, the screwdriver bits (20, 30, 80) with the different driving tips (21, 31, 81) on the conveyor (40) can be detected by the plurality of sensing members (603) with a size setting, so that the screwdriver bits (20, 30, 80) can be categorized by its size.

In conclusion, the screwdriver bits (20, 30, 80) with various types or sizes of driving tips (21, 31, 81) can be categorized by the present disclosure. The screwdriver bits (20, 30, 80) can be categorized by the type of driving tips (21, 31, 81) firstly, then the screwdriver bits (20, 30, 80) can be categorized by their size secondly. Repeat the method of the present disclosure, and various types of screwdriver bits can be categorized into different groups with a single type or single size of the driving tips (21, 31, 81) of the screwdriver bits (20, 30, 80).

What is claimed is:

1. A method for automatically categorizing screwdriver bits, comprising:
   accommodating and mixing: providing various types of screwdriver bits in a vibrating feeding cylinder;
   vibration feeding: vibrating and moving the screwdriver bits in the vibration feeding cylinder to a directional mechanism of the vibration feeding cylinder, so that all driving tips of the screwdriver bits can be arranged to face the same direction, and the screwdriver bits gradually and sequentially move into a conveyor;
   a size categorization: a size-detecting mechanism being near the conveyor, and culling or collecting unselected size of the screwdriver bits in a second collecting box, the size-detecting mechanism including a size-detecting mechanism body, a detecting rod, a plurality of sensing members disposed on one side of the detecting rod and a pushing portion; the detecting rod disposed on the size-detecting mechanism body and facing the conveyor, a pushing port disposed on the conveyor corresponding to the detecting rod; the pushing portion disposed on the same side as the detecting rod and the plurality of sensing members; wherein the screwdriver bit passes through the detecting rod in the conveyor, the sensing member detects the size of the screwdriver bit, the pushing portion pushes unselected size screwdriver bits into the second collecting box through the pushing port, and
   type categorizing: detecting and categorizing the type of screwdriver bits by a CCD mechanism with a selected type of driving tip of the screwdriver bit, and culling or collecting unselected types of the screwdriver bits in a first collecting box.

2. The method for automatically categorizing screwdriver bits according to claim 1, wherein the conveyor includes an erecting section and a categorizing section, the erecting section allows the screwdriver bits to erect from a horizontal position to a vertical position, and the driving tips of the screwdriver bits are upward; wherein the CCD mechanism is disposed near the categorizing section, and the CCD mechanism detects the driving tips of the screwdriver bit.

3. The method for automatically categorizing screwdriver bits according to claim 2, wherein the categorizing section includes a categorizing mechanism electrically connected with the CCD mechanism; wherein the CCD mechanism detects the driving tips of the screwdriver bits and generates category information to the categorizing mechanism; wherein the categorizing mechanism collects the selected type of the screwdriver bits into one part of a first collecting box and collects the unselected type of the screwdriver bits into the other part of the first collecting box.

4. A device for automatically categorizing screwdriver bits, comprising:
   a device body;
   a vibrating feeding cylinder, disposed on the device body; wherein the vibrating feeding cylinder has a rotating holder for accommodating a plurality of screwdriver bits, a conveyor connected with an upper side of the rotating holder, and a directional mechanism; wherein the vibrating feeding cylinder generates vibration to move the screwdriver bits towards the conveyor, and the screwdriver bits can be arranged to enter the conveyor with driving tip end at the front, and the screwdriver bits with driving tip end at the back can be culled and moved back to the rotating holder;
   a CCD mechanism, disposed on the device body and near the conveyor; wherein the CCD mechanism detects and categorizes the type of screwdriver bits, and collects the selected type of the screwdriver bits in one part of a first collecting box, and collects the unselected type of the screwdriver bits in the other part of the first collecting box.

5. The device for automatically categorizing screwdriver bits according to claim 4, including a size-detecting mechanism near the conveyor for detecting and categorizing the screwdriver bits by size and culling or collecting unselected or selected size of the screwdriver bits into a second collecting box; wherein the second collecting box is disposed on the device body and near the conveyor.

6. The device for automatically categorizing screwdriver bits according to claim 5, wherein the size-detecting mechanism includes a size-detecting mechanism body, a detecting rod, a plurality of sensing members disposed on one side of the detecting rod and a pushing portion; the detecting rod is disposed on the size-detecting mechanism body and faced to the conveyor, a pushing port is disposed on the conveyor corresponding to the detecting rod; the pushing portion is disposed on the same side as the detecting rod and the plurality of sensing members; wherein the screwdriver bit passes through the detecting rod in the conveyor, the sensing member detects the size of the screwdriver bit, the pushing portion pushes unselected size screwdriver bits into the second collecting box through the pushing port.

7. The device for automatically categorizing screwdriver bits according to claim 4, wherein the conveyor includes an erecting section and a categorizing section, the erecting section allows the screwdriver bits to erect from a horizontal position to a vertical position, and the driving tips of the screwdriver bits are upward; wherein the CCD mechanism is disposed near the categorizing section, and the CCD mechanism detects the driving tips of the screwdriver bits.

8. The device for automatically categorizing screwdriver bits according to claim 7, wherein the categorizing section includes a categorizing mechanism electrically connected with the CCD mechanism; wherein the CCD mechanism detects the driving tips of the screwdriver bits and generates category information to the categorizing mechanism; wherein the categorizing mechanism collects the selected type of the screwdriver bits into one part of a first collecting box, and collects the unselected type of the screwdriver bits into the other part of the first collecting box.

* * * * *